Figure 1:
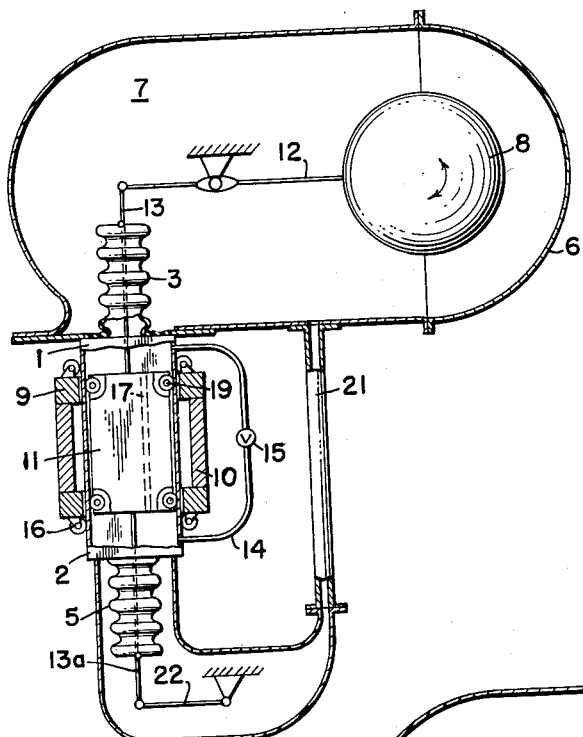

Nov. 21, 1961    HANS-MARTIN PAPE    3,009,356
IMPULSE-TRANSMITTING DEVICE
Filed May 24, 1958

INVENTOR

HANS-MARTIN PAPE

BY Richards & Geier
ATTORNEYS

United States Patent Office 3,009,356
Patented Nov. 21, 1961

3,009,356
IMPULSE-TRANSMITTING DEVICE
Hans-Martin Pape, Bremen-Horn, Germany, assignor to Gustav F. Gerdts K.G., Bremen, Germany, a corporation of Germany
Filed Mar. 24, 1958, Ser. No. 723,305
Claims priority, application Germany Mar. 28, 1957
1 Claim. (Cl. 73—305)

This invention relates to an impulse-transmitting device and refers more particularly to a device for transmitting regulating and measuring impulses through a solid wall wherein no stuffing boxes are used. By way of example, the apparatus of the present invention may be utilized for determining conditions such as vacuum, liquid level, high pressures and temperatures within the interior of a container, such as a steam boiler, and for transmitting such information to indicating and/or measuring instruments located outside of the container.

In prior art it was found that devices of such type which utilize stuffing boxes are often detrimental. Consequently, other devices were developed which utilize compressible bellows, bendable tubes, torsion tubes, or magnetic couplings, for the purpose of transmitting information from a closed container, such as the water level in a boiler. It was found that in all these devices various chemical reactions take place depending upon the properties of the medium to be measured, which have detrimental effects upon the apparatus transmitting the required information.

By way of example, as far as regulators of water level in boilers are concerned, such regulators are affected by dirt particles and water softeners, the presence of which is unavoidable, and then there is the danger that these particles will penetrate between the movable parts and the immovable wall of the information transmitting device. Therefore, a precise operation of this device is sometimes impossible to attain, particularly since chemicals dissolved in the water of the boiler and penetrating into the device create further difficulties through corrosion and the formation of a crust.

Consequently, an object of the present invention is to provide a device for transmitting impulses which is protected against dirt deposits and which operates substantially without friction, so as to be able to transmit precise impulses, such as regulating and measurable impulses which are not affected by pressure in a closed chamber which may be subjected to high pressure and temperature, or to vacuum.

Other objects of the present invention will become apparent in the course of the following specification.

The objects of the present invention may be realized through the provision of a hollow impulse transmitting member which may consist of bellows, a diaphragm, or the like, which is filled with an anti-corrosion liquid, such as oil or glycerin, and which effectively separates the interior of a boiler or other container from the casing of an apparatus used for transmitting impulses outwardly from the interior of the container. Such transmitting devices or elements may be combined with devices known in prior art, such as bendable tubes, torsion tubes, magnetic transmission, and the like.

The invention will appear more clearly from the following detailed description when taken in connection with the accompanying drawing showing, by way of example, preferred embodiments of the inventive idea.

Figure 2:
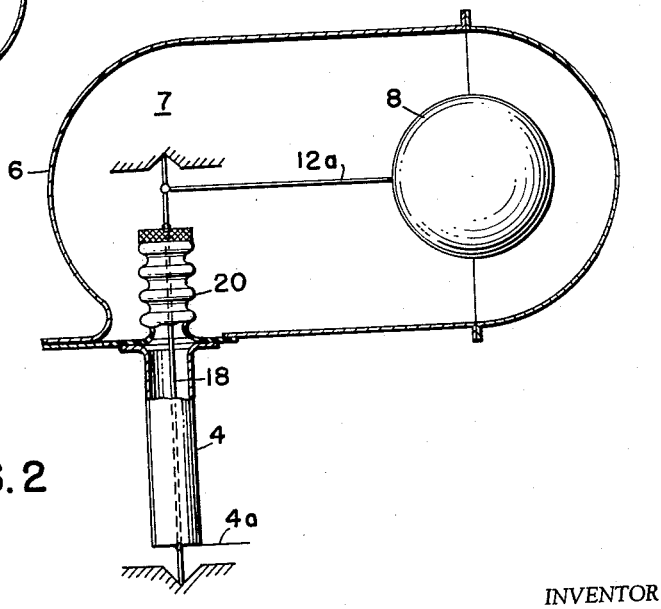

In the drawing:
FIGURE 1 is a vertical section through a device constructed in accordance with the present invention, wherein magnetic bellows transmission is utilized.
FIGURE 2 is a horizontal section through another embodiment of the invention, wherein a torsion tube is utilized.

As already stated, an important object of the present invention is to provide a transmission of impulses which is protected against dirt, which is carried out essentially without friction, and which is devoid of stuffing boxes. According to the construction shown in FIGURE 1, this is attained essentially through the use of a yieldable resilient bellows 3 which is located within the chamber 7 of a container 6, which may be a boiler or the like; furthermore, the desired results are attained by filling with an anti-corrosion liquid such as oil, glycerin, or the like, the inner chamber 1 of a tube 2. As shown in FIGURE 1, the bellows 3 communicates with the interior 1 of the tube 2 and connects the tube 2 with the container 6. Thus the tube 2 is subjected to the pressure prevailing within the container 6 and its walls must be sufficiently strong to withstand this pressure. Since the interior 1 of the tube 2 is filled with the anti-corrosion liquid, for all practical purposes there is no difference in pressure between the interior of the bellows 3 and the chamber 7 enclosing these bellows, so that the bellows 3 can be made very thin and yieldable.

In the example illustrated, the container 6 represents a steam boiler and it is required to transmit information concerning the level of water in the boiler 6 to instruments (not shown) located outside the boiler. For that purpose a float 8 is provided in the chamber 7 and is connected to a rod 12 which is suspended intermediate its ends. The rod 12 transmits the motion of the float 8 in the plane of FIGURE 1 to a rod 13 which is connected to a magnetic coupling element 9—11, which is located outside of the boiler 6, and the construction of which is known in prior art.

By way of example, the magnetic coupling element may include a permanent or electrical magnet 9, 10 which is located outside of the tube 2, and which is preferably provided with rollers 16. The magnet 9, 10 may be magnetically coupled with a non-magnetic iron core 11, which is located within the tube 2, and which is preferably provided with a bore 17. The core 11 is connected with the rod 13, so that it will be actuated by the movements of the float 8. Thus the magnet, 9, 10 will carry out the same movements at the core 11. The core 11 is guided within the tube 2 with little friction through the provision of suitable guides, such as rollers 19, and is further connected with a pivoted rod 22 so as to assure the movement of the core 11 along a straight line.

In order to provide that the movements be transmitted from the container 6 outwardly without difficulty and without additional loads, the present invention provides that the iron core 11 and the permanent magnet 9, 10 should be of such size that their weight balances the weight of the float 8.

As already stated, the constructions shown in the drawing are presented by way of illustration only, so that, for example, the float 8 may be conveniently replaced by a submerged piston, a diaphragm, or the like. Any suitable anti-corrosion liquid may be used to fill the chamber 1, although oil and glycerin were found to be particularly effective. The bellows 3 may be also replaced by a diaphragm or other suitably constructed yieldable element.

Since the magnetic coupling 9—11 is known in the art, it is not further illustrated.

As shown in FIGURE 1, the bellows 3 is connected with the rod 13, so that it is movable along with the rod 13. Another bellows 5 is located at the opposite end of the tube 2 and is connected with the rod 13a, constituting a continuation of the rod 13. It is thus apparent that while the bellows 3 separates the chamber 1 filled with the anti-corrosion liquid from the chamber 7, the bellows 5 serves for balancing the pressure. The bellows 3 and 5 are so yieldably constructed that pressure prevailing in the chamber 7 of the container 6 is transmitted to its entire extent for all practical purposes upon the anti-corrosion liquid located in the chamber 1. Thus the bellows 3 and 5 serve essentially to prevent the mixing of the water within the chamber 7 with the anti-corrosion liquid in chamber 1. Furthermore, in the construction shown in FIGURE 1, the bellows 5 serves for balancing the volume of the bellows 3.

While the main purpose of the anti-corrosion liquid in chamber 1 is to prevent corrosion and formation of crust upon the walls of the various parts, it also serves effectively as a liquid brake. For that purpose the tube 2 is provided with a pipe 14 serving as a shunt channel and carrying a valve 15 which may be operated from the outside. Due to this arrangement, the movements of the liquid may be damped if necessary, and undesirable up and down movements may be avoided.

Furthermore, in accordance with the invention, in addition to the pressure equalizing means 14 for the impulse-transmitting device, there is provided a pressure equalizing passage 21 formed by a tube communicating at one end with the interior 7 of the container 6. The other end of the tube 21 encloses the bellows 5 and is connected to the tube 2.

The operation of the device is apparent from the above description:

The up and down movements of the float 8 will be transmitted by the rods 12 and 13 to the magnetic coupling 9, 11 and thence they will be transmitted in the manner known per se and not further illustrated, to an indicator or a steering device, such as a regulating nozzle, which is not shown in the drawings. The described arrangement comprising the bellows 3 and 5 and the tube 2 filled with oil, will assure an effective operation of the transmitting device which is essentially free of friction, and which is protected most effectively against crust formation and deposits.

The construction shown in FIGURE 2 also includes a container 6 which may consist of a steam boiler and which contains a float 8 connected to a rod 12a and movable in a plane perpendicular to that of FIGURE 2. However, in this construction the magnetic coupling shown in FIGURE 1 is replaced by a torsion tube 4 which is known per se, and which is connected with the rod 12a by means of a rod 18. The outer end of the torsion tube 4 carries the usual indicator 4a. In this construction the interior of the tube 4 is filled with the anti-corrosion liquid and this interior is separated from the chamber 7 of the container 6 by means of a yieldable torsion hose 20, which transmits the pressure within the chamber 7 to the anti-corrosion liquid within the tube 4.

In accordance with this construction, the movements of the float 8 are transmitted directly by the rod 12a through the rod 18 to the torsion tube 4, and thence are transmitted to an indicating or regulating device in a manner known in the art, and not shown in the drawings.

It is further apparent that the examples shown above have been given solely by way of illustration and not by way of limitation, and that they are subject to many variations and modifications within the scope of the present invention. All such variations and modifications are to be included within the scope of the present invention.

What is claimed is:

An impulse-transmitting device, comprising in combination with a container adapted to contain a fluid, a float located within said container and adapted to be moved by said fluid, and a rod having an end connected to said float, said container having an opening formed therein; a yieldable torsion hose located within said container and having a closed end and an open end firmly connected with the edges of said opening, a torsion tube located outside of said container and having a closed end and an open end firmly connected with the edges of said opening opposite the open end of said torsion hose, said torsion tube being coaxial with said torsion hose, whereby the interiors of said torsion hose and said torsion tube form a single chamber, and a rod firmly connected to another end of the first-mentioned rod and to the closed end of said torsion tube, the second-mentioned rod extending axially through said chamber, said chamber being adapted to be filled with an anti-corrosion liquid.

References Cited in the file of this patent

UNITED STATES PATENTS

| | | |
|---|---|---|
| 1,173,038 | Roschanek | Feb. 22, 1916 |
| 1,607,706 | Toulmin | Nov. 23, 1926 |
| 1,827,560 | Binckley | Oct. 13, 1931 |
| 2,137,880 | Loesser | Nov. 22, 1938 |
| 2,252,029 | Pieper | Aug. 12, 1941 |
| 2,431,200 | Rosenberger | Nov. 18, 1947 |
| 2,416,570 | Coleman | Feb. 25, 1947 |
| 2,547,630 | Evans | Apr. 3, 1951 |
| 2,633,022 | Rosenberger et al. | Mar. 31, 1953 |
| 2,685,797 | Morschel | Aug. 10, 1954 |
| 2,753,885 | White | July 10, 1956 |